(12) United States Patent
Yang

(10) Patent No.: US 7,644,728 B2
(45) Date of Patent: Jan. 12, 2010

(54) SPLITTER FOR FAUCETS

(76) Inventor: Tsai-Chen Yang, P.O. Box 44-2049, Taipei (TW) 10668

( * ) Notice: Subject to any disclaimer, the term of this patent is extended or adjusted under 35 U.S.C. 154(b) by 546 days.

(21) Appl. No.: 11/703,633

(22) Filed: Feb. 8, 2007

(65) Prior Publication Data

US 2008/0190501 A1    Aug. 14, 2008

(51) Int. Cl.
*F16K 11/06* (2006.01)
(52) U.S. Cl. ............ 137/625.15; 137/625.46; 251/297
(58) Field of Classification Search ............ 137/625.11, 137/625.15, 625.46, 625.47; 251/297
See application file for complete search history.

(56) References Cited

U.S. PATENT DOCUMENTS

| | | | | |
|---|---|---|---|---|
| 3,385,321 A | * | 5/1968 | Ehrens et al. | 137/625.46 |
| 3,780,758 A | * | 12/1973 | DeVries | 137/454.6 |
| 3,837,360 A | * | 9/1974 | Bubula | 137/625.46 |
| 5,193,582 A | * | 3/1993 | Antoniello et al. | 137/625.14 |
| 5,316,042 A | * | 5/1994 | Lim et al. | 137/625.11 |
| 5,881,770 A | * | 3/1999 | Neill et al. | 137/625.11 |
| 6,575,196 B1 | * | 6/2003 | Creswell | 137/625.46 |
| 6,789,573 B2 | * | 9/2004 | Knapp | 137/625.15 |
| 7,059,349 B2 | * | 6/2006 | Breda | 137/625.11 |

* cited by examiner

*Primary Examiner*—John Fox

(57) ABSTRACT

A splitter for faucets includes a body in which a control unit is received. The control unit includes a collar in which a ceramic disk is received. The ceramic disk has a plurality of through holes and a number of the through holes is equal to a number of the outlets of the body. A ceramic plate is connected to the ceramic disk so as to cover some of the through holes in the ceramic disk. The ceramic disk is connected with a control shaft which has a resilient member on a radial portion thereof. An end member is mounted to radial portion and includes a plurality of gaps so that when the control shaft is rotated, the protrusion on the resilient member is removably engaged with one of the gaps so as to generate a sound.

7 Claims, 6 Drawing Sheets

SPLITTER FOR FAUCETS

BACKGROUND OF THE INVENTION (1) Field of the Invention

The present invention relates to a splitter for a faucet wherein a sound is generated when the knob of the splitter is rotated to a desired position.

(2) Description of the Prior Art

A conventional faucet generally includes a valve which controls the volume of hot water and cold water flowing from the faucet. The control can be done by operation of a knob or a control lever. A ball-shaped core is usually connected with the knob or the control lever so as to align passages in the ball-shaped core with the outlets of the hot water and the cold water. However, the volume of the hot water or cold water has to be measured by experience when operating the knob or the control lever. Water often wastes a lot during operation repeatedly of the knob or the control lever.

The present invention intends to provide a splitter wherein the knob is connected with a control shaft and the control shaft has a resilient member which is removably engaged with one of three gaps to set the desired aperture to be opened, when the resilient member is engaged with the gap, a click sound is generated so that the user is acknowledged a desired position is reached. By the special feature of the splitter, the user needs not to try multiple times to set a desired position of the control shaft.

SUMMARY OF THE INVENTION

The present invention relates to a splitter for faucets and the splitter comprises a body having an inlet tube and a plurality of outlet tubes. A recessed space is defined in an end of the body and a separation member is located in the recessed space in the body so as to separate the inlet tube and the outlet tubes. The separation member has a plurality of outlets communicating with the outlet tubes, and a passage communicating with the inlet tube.

A control unit comprises a collar which is received in the recessed space and has at least one aperture. A ceramic disk is engaged with a first end of the collar and has a plurality of through holes. A number of the through holes is equal to a number of the outlets. A ceramic plate is connected to the ceramic disk and covers some of the through holes of the ceramic disk. A control shaft has a radial portion, a shank and a covering plate. The radial portion has at least one resilient member which includes a protrusion and the radial portion is connected an end of the shank. The covering plate is connected to an end of the radial portion and located corresponding to the ceramic plate. An end member is mounted onto the radial portion of the control shaft and has a plurality of gaps. A locking cap is mounted to an outer periphery of the recessed space and the control shaft extends through the locking cap and is connected with a knob. When rotating the knob, the control shaft is rotated and the protrusion of the resilient member is removably engaged with one of the gaps in the end member so as to generate a sound.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
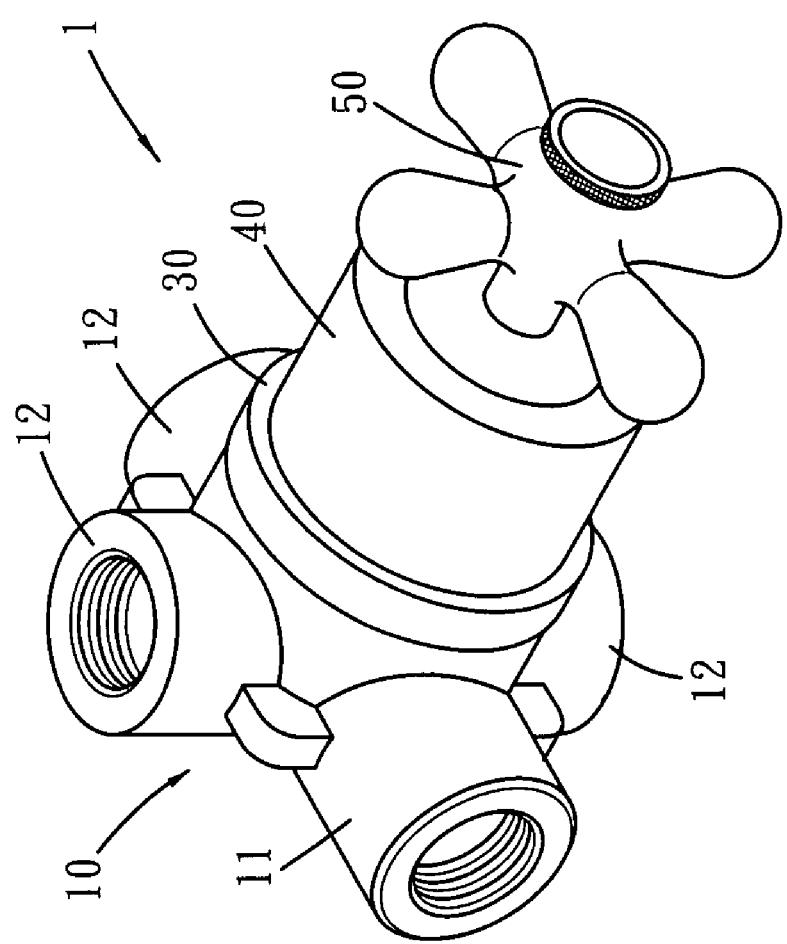
FIG. 1 is a perspective view to show the splitter of the present invention.
Figure 2:
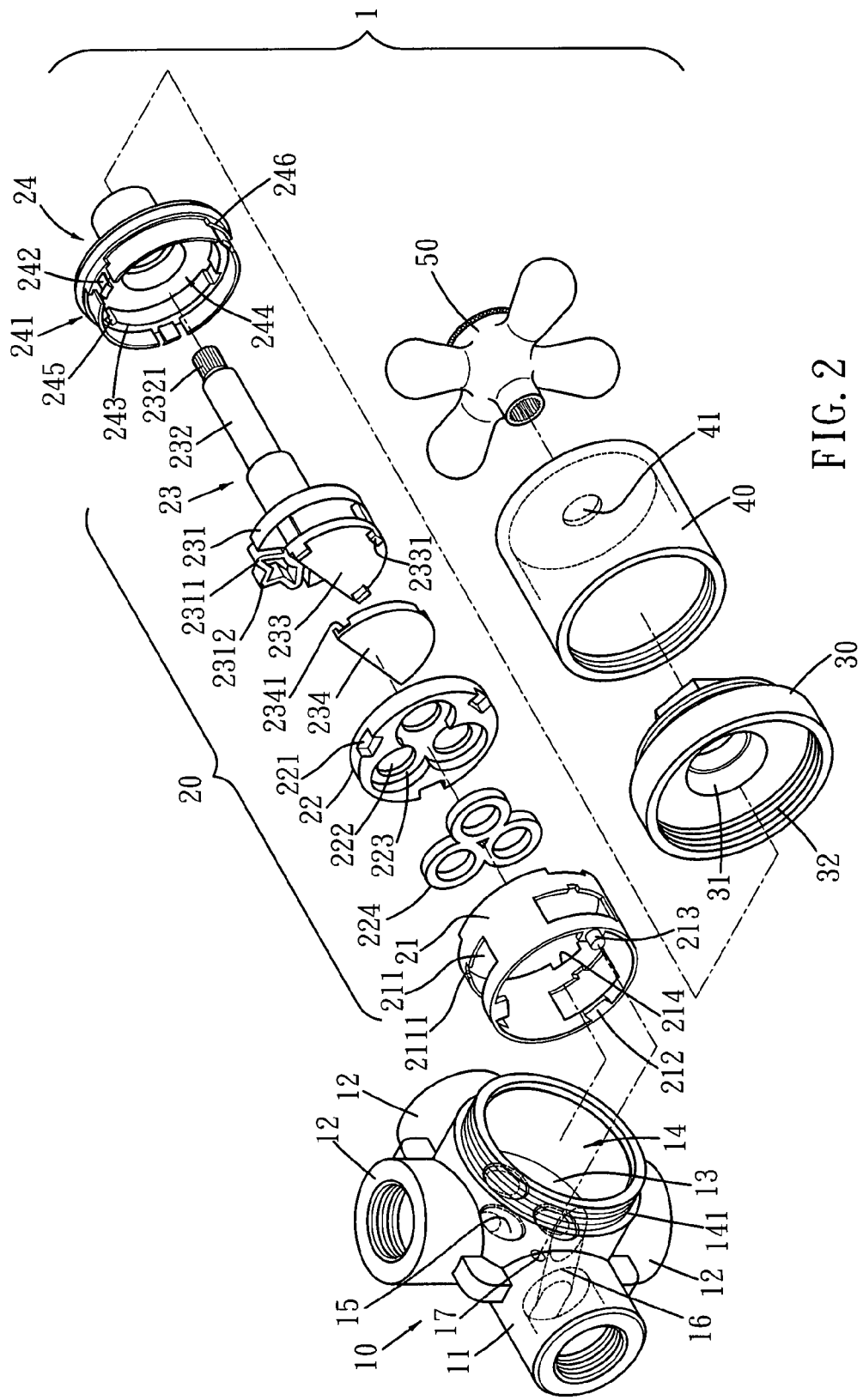
FIG. 2 is an exploded view to show the splitter of the present invention.
Figure 3:
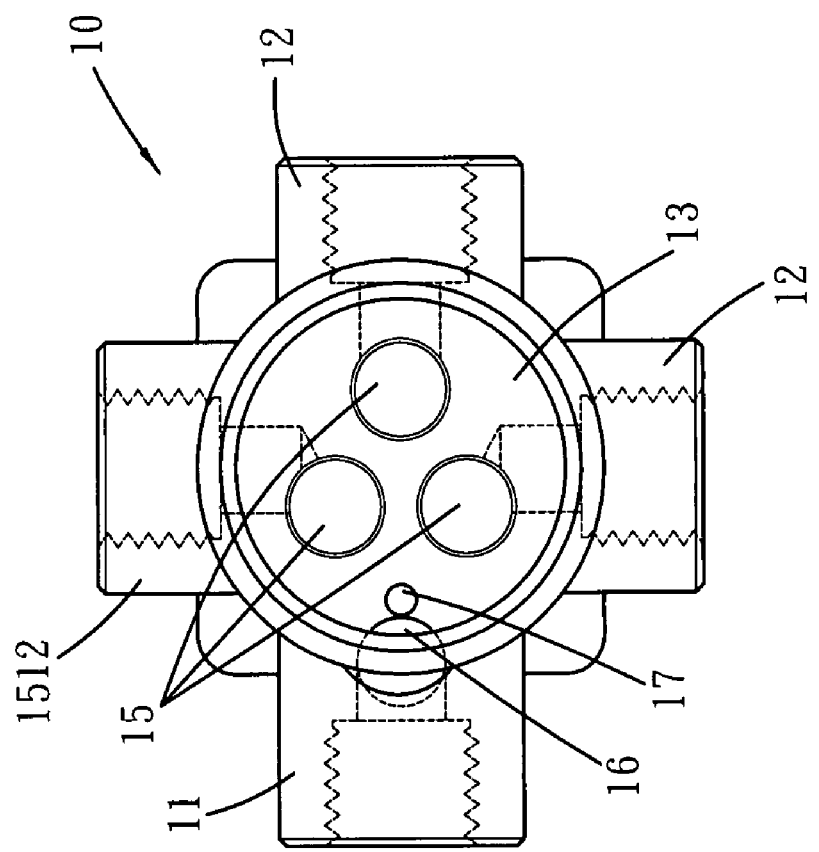
FIG. 3 is an end view of the splitter of the present invention.
Figure 4:
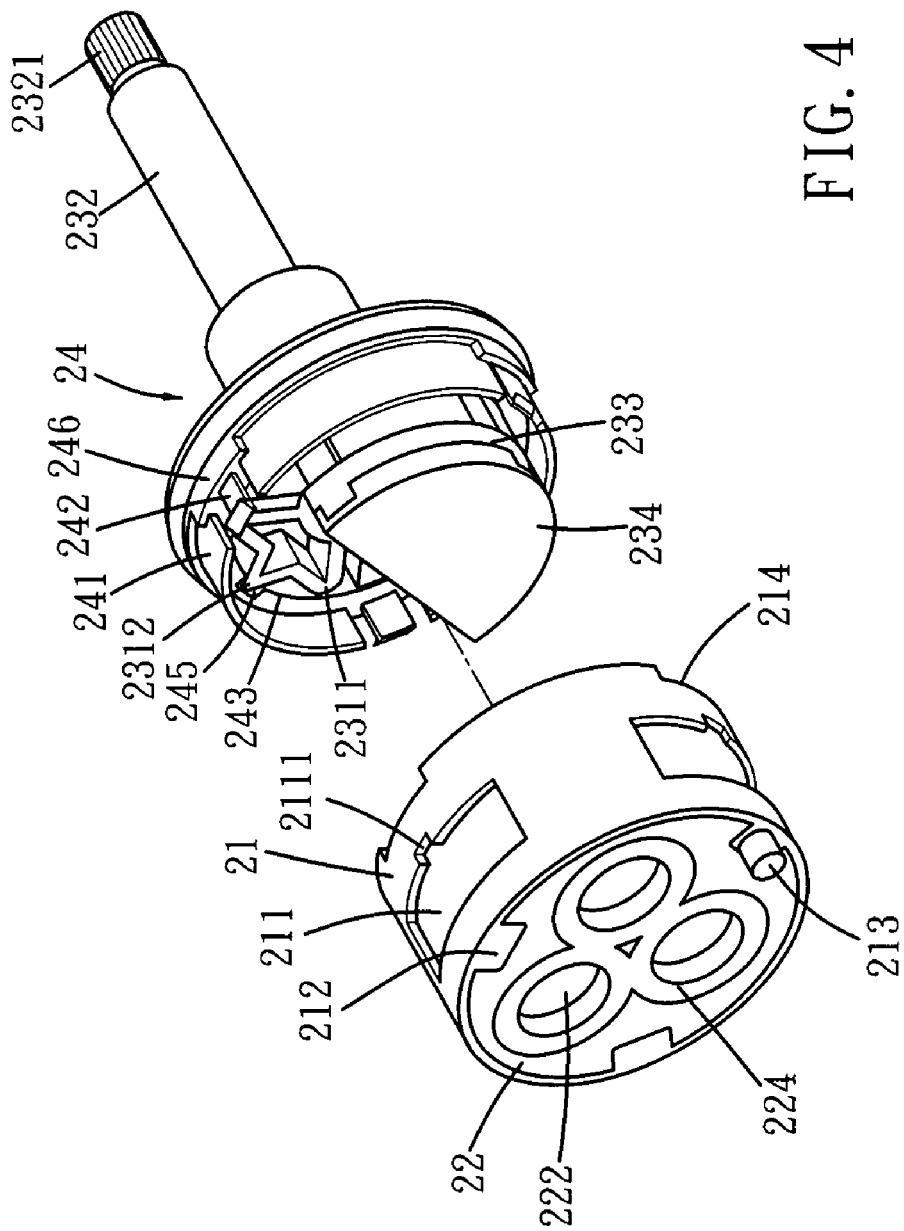
FIG. 4 shows that the collar and the ceramic disk are to be connected with the end member of the splitter of the present invention.
Figure 5:
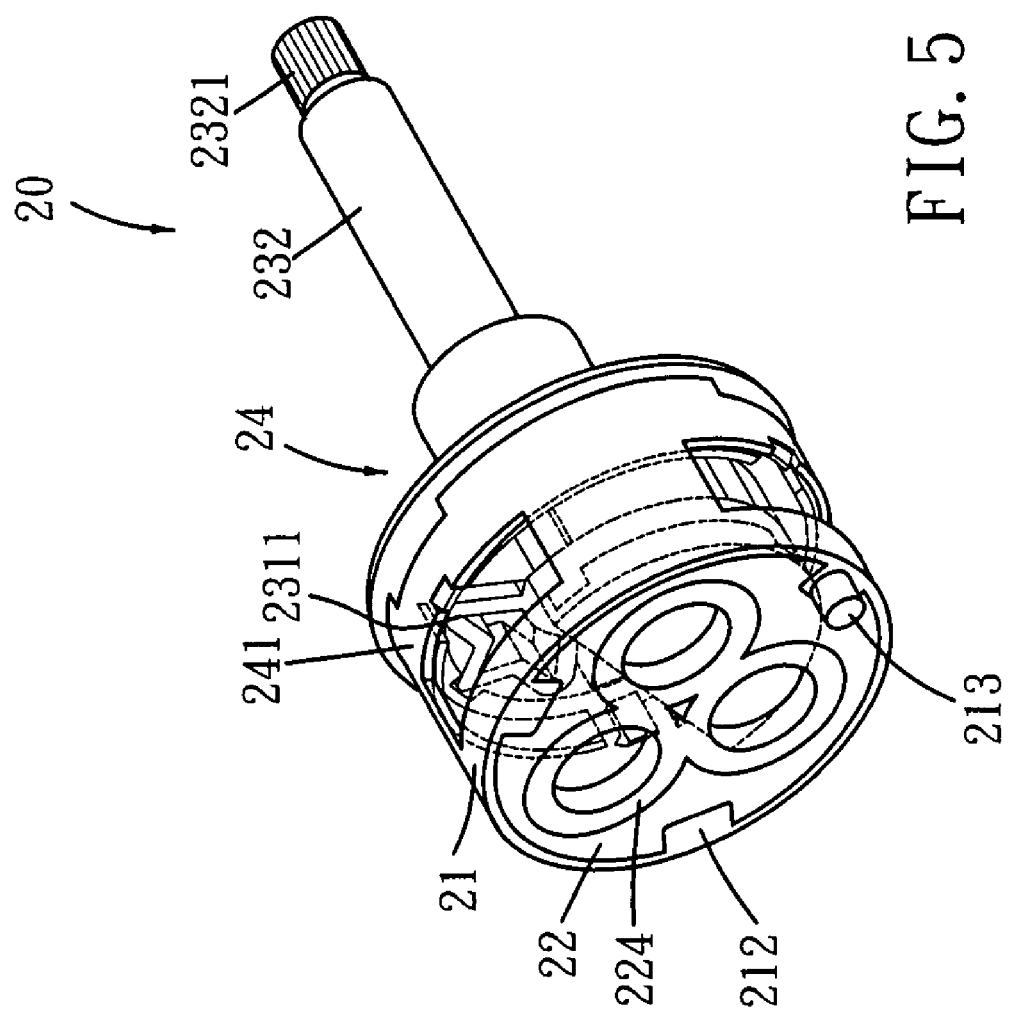
FIG. 5 is a perspective view to show the control unit of the splitter of the present invention.

Referring to FIGS. 1 to 5, the splitter 1 for faucets of the present invention comprises a body 10 which has an inlet tube 11 and three outlet tubes 12 respectively connected thereto. Each of the inlet tube 11 and three outlet tubes 12 has inner threads so as to be connected with hose, pipe or the like. A recessed space 14 is defined in an end of the body 10 and a separation member 13 is located in the recessed space 14 in the body 10 so as to separate the inlet tube 11 and the outlet tubes 12. The separation member 13 has three outlets 15 and a passage 16 defined therethrough, the outlets 15 respectively communicate with the outlet tubes 12 and the passage 16 communicates with the inlet tube 11.

A control unit 20 comprises a collar 21, a ceramic disk, 22, a ceramic plate 234, a control shaft 23 and an end member 24. The collar 21 is received in the recessed space 14 and has three apertures 211. A notch 2111 is defined in a periphery defining each of the three apertures 211. Three engaging cavities 214 are defined in the first end of the collar 21 and three insertions 212 extend inward from a second end of the collar 21. The separation member 13 has at least one positioning hole 17 defined in a surface thereof and the collar 21 has a positioning rod 213 which is inserted into the at least one positioning hole 17. The ceramic disk 22 has a plurality of recesses 221 with which the insertions 212 are engaged so that the ceramic disk 22 is engaged with the second end of the collar 21. The ceramic disk 22 further has a plurality of through holes 222. A number of the through holes 222 is equal to a number of the outlets 15.

The ceramic plate 234 for covering some of the through holes 222 of the ceramic disk 22 is connected to a covering plate 233 on the control shaft 23. The control shaft 23 has a radial portion 231, a shank 232 extending from a side of the radial portion 231, and the covering plate 233 is connected to the other side of the covering plate 233. The covering plate 233 has three connection blocks 2331 on an end surface thereof and the ceramic plate 234 has three locking notches 2341 with which the connection blocks 2331 are engaged. The radial portion 231 has at least one resilient member 2311 which includes a protrusion 2312.

A locking cap 30 has inner threads 32 which are threadedly mounted to the outer threads 141 defined in an outer periphery of the recessed space 14. The control shaft 23 extends through a central hole 31 in the locking cap 30 has axial grooves 2321 defined in a distal end thereof that extends out from the locking cap 30 so as to be connected with a knob 50. A decoration member 40 is mounted onto the locking cap 30 and includes another central hole 41 through which the control shaft 232 extends.

It is noted that the end member 24 has a stepped neck 241 on which three hooks 242 are formed which are engaged with the notches 2111 of the collar 21. The stepped neck 241 has three positioning plates 246 which are located corresponding to the three hooks 242 respectively. The positioning plates 246 are engaged with three engaging cavities 214 defined in the first end of the collar 21. The radial portion 231 of the control shaft 23 is then accommodated in a recessed area 244 enclosed by the stepped neck 241. A ridge 243 extends from an inner periphery of the stepped neck 241 of the end member 24 and includes three gaps 245. The protrusion 2312 of the resilient member 2311 is removably engaged one of the three gaps 245. The ceramic disk 22 has a recessed area 223 through which the through holes 222 are defined, and a seal 224 is engaged with the recessed area 223. The ceramic plate 234 and the ceramic disk 22 are all made by ceramic material so that the contact surface can be sealed as desired and does not have leak when operating the control shaft 23.

Figure 6B:
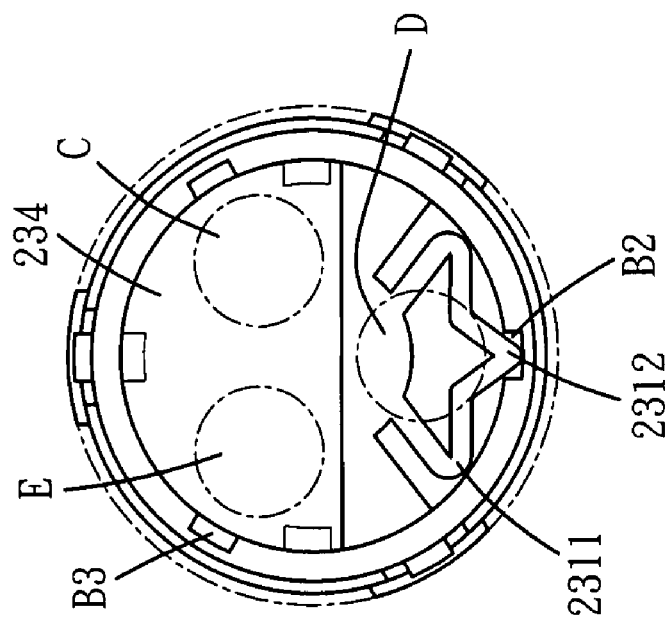
FIG. 6B shows when the protrusion of the resilient member is engaged with another one of the gaps.
Figure 6A:
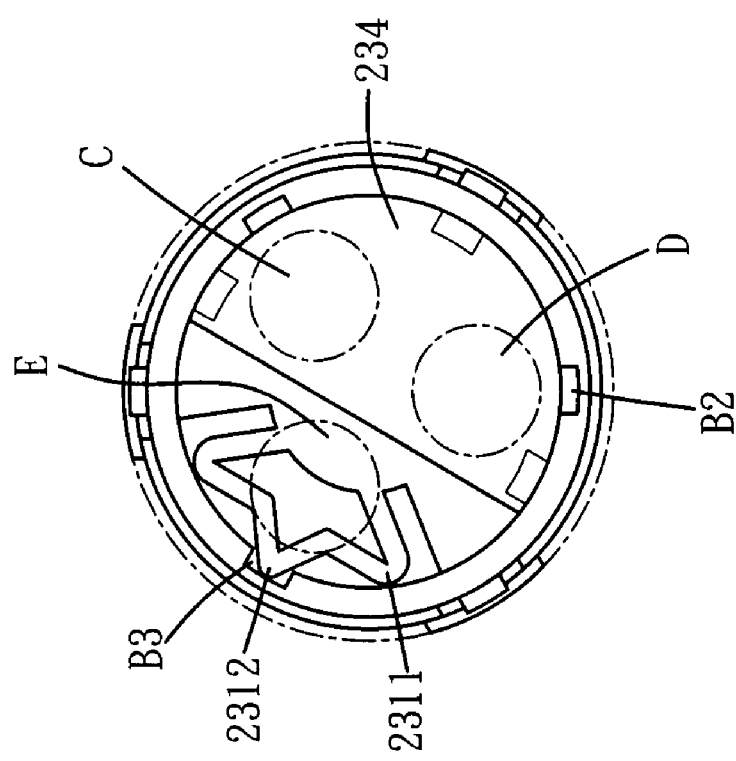
FIG. 6A shows when the protrusion of the resilient member is engaged with one of the gaps.

As shown in FIGS. 6A and 6B, when the protrusion 2312 is engaged with the gap "B", the ceramic plate 234 covers the outlets "C" and "D", so that water flows through the outlet "E" only. When the user rotates the knob 50 an angle, the ceramic plate 234 is rotated to cover the outlets "C" and "E", and only the outlet "D" is opened. The resilient member 2311 is deformed slightly and the protrusion 2312 is removed from the gap "B3" and is engaged with the gap "B2". When the protrusion 2312 is engaged with the gap "B2", a sound is generated so that the user is acknowledged a correct position is reached, so that he or she may stop rotating the knob 50. By the sound, the user is clearly informed where the desired position is reached and the knob 50 does not need to be rotated back and forth as the way conventional knob is operated.

While we have shown and described the embodiment in accordance with the present invention, it should be clear to those skilled in the art that further embodiments may be made without departing from the scope of the present invention.

What is claimed is:

1. A splitter for faucets, comprising:

a body having an inlet tube and a plurality of outlet tubes respectively connected thereto, a recessed space defined in an end of the body and a separation member located in the recessed space in the body so as to separate the inlet tube and the outlet tubes, the separation member having a plurality of outlets and a passage defined therethrough, the outlets respectively communicating with the outlet tubes and the passage communicating with the inlet tube;

a control unit comprising a collar, a ceramic disk, a ceramic plate, a control shaft and an end member, the collar received in the recessed area and having at least one aperture, the ceramic disk engaged with the collar and having a plurality of through holes and a number of the through holes being equal to a number of the outlets, the ceramic plate covering some of the through holes of the ceramic disk, the control shaft having a radial portion, a shank and a covering plate, the radial portion having at least one resilient member which includes a protrusion, the radial portion connected to an end of the shank and the covering plate connected to an end of the radial portion, the covering plate located corresponding to the ceramic plate;

a locking cap mounted to an outer periphery of the recessed space and the control shaft extending through the locking cap, and a knob connected to a distal end of the control shaft and located outside of the locking cap.

2. The splitter as claimed in claim 1, wherein a decoration member is mounted onto the locking cap.

3. The splitter as claimed in claim 1, wherein the separation member has at least one positioning hole defined in a surface thereof and the collar has a positioning rod which is inserted into the at least one positioning hole.

4. The splitter as claimed in claim 1, wherein the collar includes a plurality of insertions which extend inward from a second end of the collar, the ceramic disk has a plurality of recesses with which the insertions are engaged.

5. The splitter as claimed in claim 1, wherein a notch is defined in a periphery defining the at least one aperture and the end member has a stepped neck on which a hook is formed which is engaged with the notch.

6. The splitter as claimed in claim 5, wherein the stepped neck has a positioning plate which is located corresponding to the hook, the positioning plate is engaged with an engaging cavity defined in the first end of the collar.

7. The splitter as claimed in claim 1, wherein the ceramic disk has a recessed area through which the through holes are defined, a seal is engaged with the recessed area.

* * * * *